COPY MEMORY FOR A DIGITAL PROCESSOR

Filed Nov. 16, 1964 2 Sheets-Sheet 1

INVENTOR.
ROBERT V. BOCK
BY
Christie, Parker & Hale
ATTORNEYS.

COPY MEMORY FOR A DIGITAL PROCESSOR

Filed Nov. 16, 1964 2 Sheets-Sheet 2

INVENTOR.
ROBERT V. BOCK
BY Christie, Parker & Hale
ATTORNEYS

United States Patent Office 3,339,183
Patented Aug. 29, 1967

3,339,183
COPY MEMORY FOR A DIGITAL PROCESSOR
Robert V. Bock, Sierra Madre, Calif., assignor to Burroughs Corporation, Detroit, Mich., a corporation of Michigan
Filed Nov. 16, 1964, Ser. No. 411,366
3 Claims. (Cl. 340—172.5)

ABSTRACT OF THE DISCLOSURE

There is described a computer system in which a processor communicates in conventional manner with an addressable core memory. A copy memory including a high speed thin film memory stores a limited number of words which are duplicates of words stored in the core memory. The copy memory includes also an associative memory which stores the addresses in the core memory of the duplicate words stored in the thin film memory. When the processor addresses the memory to fetch or read out a word from memory, the address is compared by the associative memory to determine if the duplicate word is in the high speed thin film memory.

Figure 1:
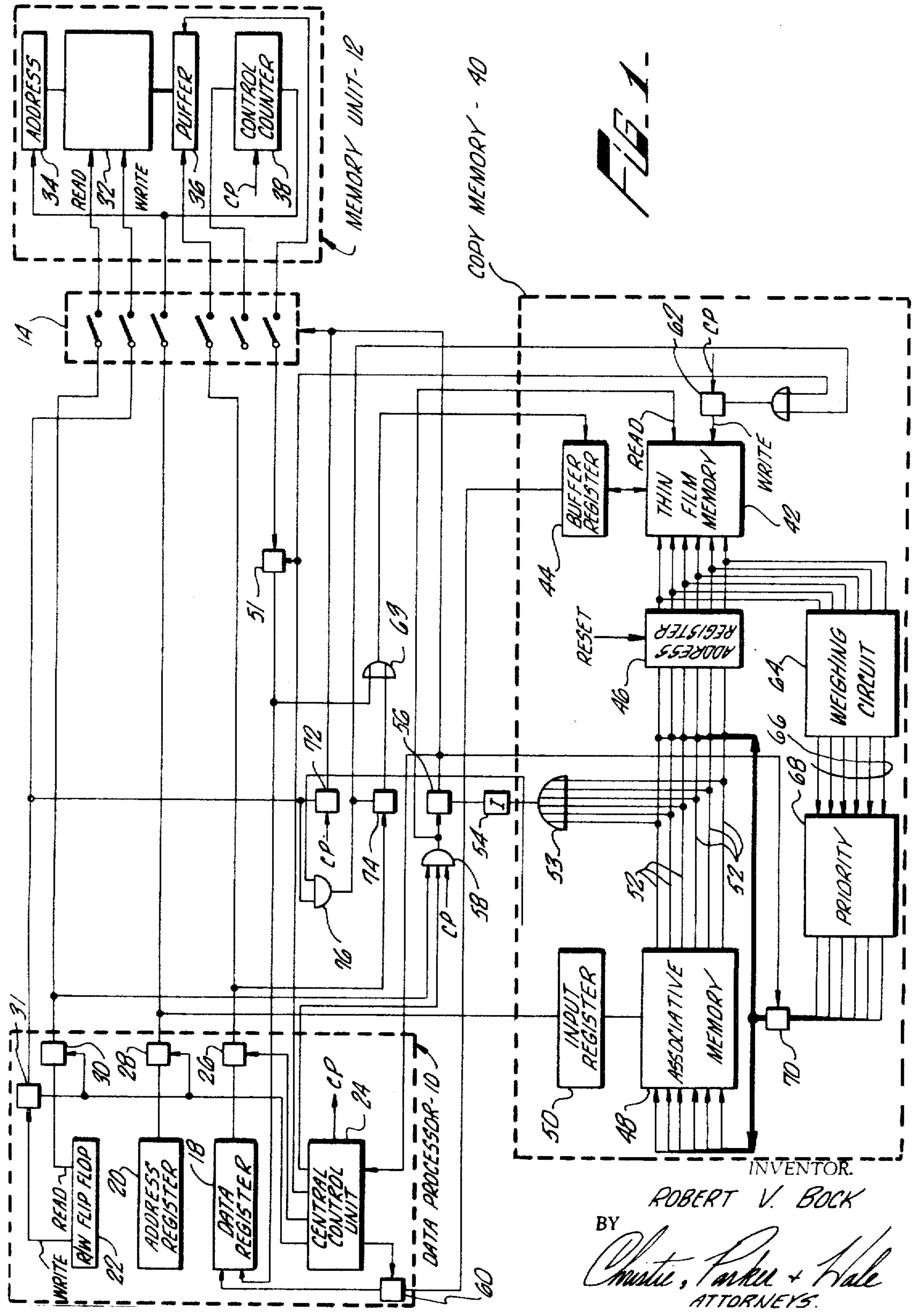

This invention relates to digital processors and, more particularly, is concerned with a processor utilizing a low capacity, high speed auxiliary memory to increase processor speed.

In a digital computer system, the processor must repeatedly have access to a memory storage device in which instructions and operands are stored. To increase the overall speed of operation of the processing system, continual efforts have been made to provide a memory system in which the access time is made as short as possible. Various memory devices have been developed such as the core memory, the magnetic drum, the thin film memory and others which differ in cost per bit stored, in access times and the like. Generally, the design of a computer system is a compromise between the speed of the memory, the capacity in the memory and the cost. While thin film memories, for example, provide much higher access speed, their cost for a given storage capacity is presently substantially greater than a core memory. The present invention is directed primarily to a computer which utilizes a core memory in conventional fashion, but in which the processing speed can be increased by a substantial amount without changing the basic clock rate of the central control of the computer. This is accomplished by means of an auxiliary memory, referred to herein as a copy memory, which utilizes a high speed, thin film memory unit of relatively small storage capacity. The copy memory holds copies of words stored in the core memory and makes these words available to the computer during a memory access at a much higher speed than they would be available from the core memory. The copy memory comes into play where the processor makes repeated access to the same word in the core memory. The copy memory is designed to accumulate words from the main memory which are most likely to be used repeatedly by the processor. Whenever the processor attempts to access a word stored in the main core memory which is also held in the copy memory, the word is taken from the copy memory directly and the main memory access is not initiated. Because the copy memory operates at much higher speed, the access time is thus substantially reduced. The copy memory includes a circuit for weighing the frequency with which any particular word is accessed in the copy memory and means is provided for automatically replacing a word which is not accessed within some predetermined time interval. This replacement is automatically carried out at the time a memory access to the main core memory is effected.

While normally the copy memory is not involved in a "write" operation in which words are stored in the main memory from the processor, a word in the copy memory may be modified at the same time a "write" operation is undertaken, if the word already stored in the core memory is also stored in the copy memory. In other words, where there is an updating or modification of a word in the core memory, the same updating or modification takes place in the copy memory if the particular word is stored in both the main memory and the copy memory.

Figure 2:
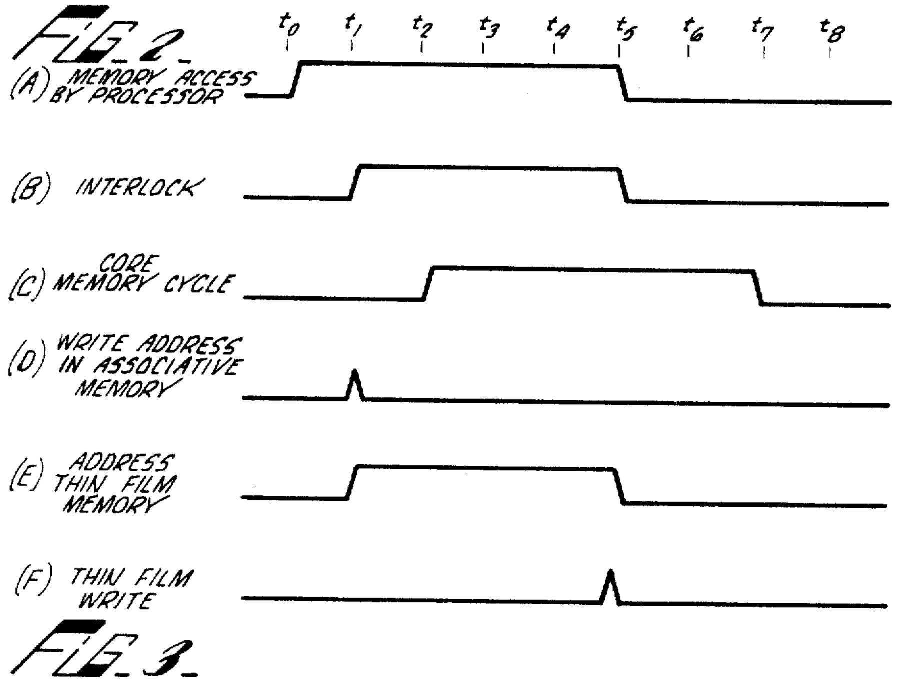
Figure 3:
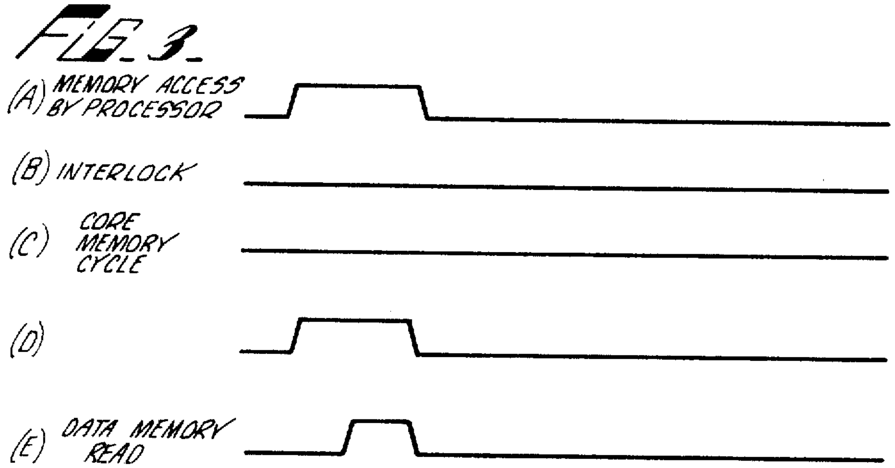
Figure 4:
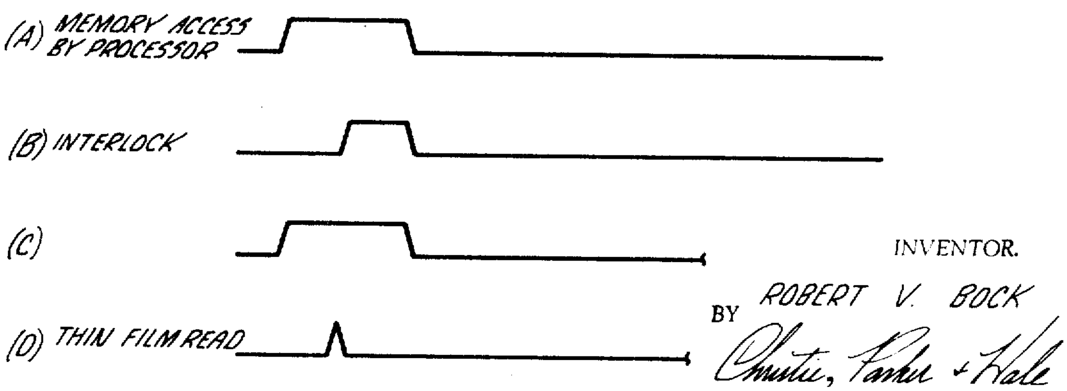

For a more complete understanding of the invention, reference should be made to the accompanying drawings wherein:

FIGURE 1 is a block schematic diagram of an embodiment of the present invention; and FIGURES 2, 3 and 4 are a series of waveforms used in explaining the operation of the embodiment of FIGURE 1.

Referring to FIGURE 1 in detail, the numeral 10 indicates generally a conventional electronic digital data processor. The processor 10 is connected to an addressable core memory unit 12 through a switch interlock 14. In a typical computer system, there may be more than one processor 10 and more than one memory unit 12. The switch interlock 14 is arranged to provide the interconnection between a particular processor 10 and memory unit 12 in the manner described in copending application Ser. No. 89,525, filed Feb. 15, 1961 and assigned to the same assignee as the present patent application. For the purpose of explaining the present invention, the switch interlock 14 is shown schematically as a series of mechanical switches which are closed in response to a signal applied to an input line 16. It will be understood that in practice the interlock will be a high speed switching matrix as described in detail in copending application Ser. No. 242,022, filed Dec. 3, 1962, now Patent No. 3,268,874 and assigned to the same assignee as the present patent application.

The processor 10 includes the usual programming circuits, address registers, and information registers and associated timing and control circuits for performing computations on information stored in the memory unit 12. Shown in the figure is a data register 18 which receives words from the memory unit 12 during a memory read operation and which stores a word for transfer to the memory unit 12 during a memory write operation. In addition, the processor includes an address register 20 in which the address location in the core memory 12 required during a read or write operation is stored. In addition, the processor 10 includes a control flip-flop 22 which is set by the processor to indicate that either a memory read or memory write operation is required.

A central control unit for the processor 10 is indicated generally at 24 which includes all the timing and logic circuitry for controlling operations of the processor 10. The control unit 24 includes a clock pulse generating source for generating a clock pulse, designated CP, at periodic intervals. The manner in which the processor 10 communicates with the memory unit 12 is fully described in the above-mentioned copending application Ser. No. 242,022.

The information in the data register 18 is transferred to the switch interlock 14 by a gating circuit 26 in response to a gating signal generated by the central control 24. Similarly, the address information in the address register 20 is gated to the switch interlock 14 by a gating circuit 28 as is the read/write information in the flip-flop 22 by a gating circuit 30. Both the gating circuits 28 and 30 are controlled in response to the central control unit 24 in a manner hereinafter described.

The memory unit 12 includes a coincident core memory 32 which is addressed in response to information stored in a memory address register 34. Data words are transferred between the coincidence core memory 32 and an information buffer register 36. The memory unit 12 also includes a control counter 38 which in response to clock pulses controls the operation of the memory unit 12.

The present invention is directed to a high speed copy memory, indicated generally at 40, which is connected at the interface between the processor 10 and the interlock 14. The copy memory 40 operates as a small, high speed memory which holds copies of words stored in the core memory unit 12. It functions to accumulate words which are most likely to be used repeatedly by the processor. Because of its high speed operation, the copy memory is capable of supplying those words to the processor at much higher speed than they could be read directly from the core memory unit 12.

The copy memory 40 includes a high speed thin film data memory unit 42 which has associated therewith a buffer register 44 for storing a word as it is transferred in or out of the thin film memory 42. The thin film memory 42 operates as a linear select memory in which the selection lines are controlled by flip-flops in a register 46.

Addressing of the thin film memory 42 is controlled by an associative memory, indicated generally at 48, having an input buffer register 50. The associative memory 48 may be of a type described in more detail in copending application Ser. No. 236,310, filed Nov. 8, 1962, entitled "Memory System" and assigned to the same assignee as the present patent application. The associative memory 48 is capable of storing a group of digitally coded words, which words, in the present application, constitute addresses derived from the address register 20 of the processor 10. Once the address words are stored in the associative memory 48, whenever a word is placed in the input register 50, the associative memory circuit 48 functions to make a comparison simultaneously between each of the words in the associative memory and the word in the input register 50. If a match occurs between one of the words in the associative memory and the word in the input register 50, a signal in the form of a voltage level is produced on a corresponding one of the output lines from the associative memory 48. There is one output line for each word stored in the associative memory, the output lines being indicated at 52. Six output lines are shown by way of example only. Normally, the capacity of the associative memory 48 and the thin film memory 42 would be as many as thirty-two words.

In operation, when the processor requires a data word from the memory unit 12, an address is established in the register 20 and the flip-flop 22 is set to indicate the start of a memory access at some clock time $t_0$ as shown in the timing diagram of FIGURE 2A. At the same time, the control unit 24 generates a gating pulse which is applied to the gates 28 and 30. This applies the address levels from the register 20 and the read/write level of the flip-flop 22 to the interlock 14. In response to the next clock pulse at time $t_1$, the interlock 14 is operated to complete connections to the memory unit 12, as shown in FIGURE 2B. The presence of address levels applied to the address register 34 and to the control counter 38 in the memory 12 initiates a core memory cycle at the next clock pulse time $t_2$, as shown in FIGURE 2C.

A complete memory cycle of the core memory circuit requires five clock pulse intervals. During the clock pulse interval time ending at $t_3$, the core memory is addressed. By the clock pulse time $t_4$, the addressed data word is transferred from the core memory to the buffer register 36 making the word available for transfer to the data register 18. At the end of the clock pulse interval $t_5$, the word in the memory buffer register is transferred through the switch interlock 14 and through a gate 51, opened at time $t_5$ by the central control unit 24, to the data register 18 of the processor, completing the memory read cycle of the processor. However, the memory unit 12 takes two more clock cycles by the control counter to store the word in the buffer register 36 back in the core memory and to clear the registers in the memory unit 12. The construction and operation of the memory unit is conventional and well known. Further detailed description is therefore not considered necessary. For further details on the operation of the core memory unit see the above-identified copending applications.

It is significant to note that the entire read cycle of the processor requires five clock pulse intervals to complete the operation. By using a high speed copy memory 40 as provided by the present invention, frequently used data words are available to the processor 10 on a read cycle in much shorter time, namely two clock pulse intervals, if they are stored in the copy memory 40. To this end, when a memory cycle such as described above is initiated in the data processor 10, the address stored in the address register 20, at the same time it is transferred by the gate 28 to the switch interlock 14, is also transferred to the input register 50 of the associative memory 48. A group of addresses is stored in the associative memory. If any one of these addresses is identical to the address placed in the input register 50, the data word required by the data processor 10 may be obtained from the thin film data memory 42 and no memory access of the memory unit 12 is required. FIGURES 3A–E show the timing frequency where the word being addressed is stored in the copy memory 40.

As pointed out above, the associative memory 48 is arranged to make a simultaneous comparison between all of the addresses stored in the associative memory 48 with the address stored in the input register 50. The associative memory has an output line for each word stored therein, the output lines being indicated at 52. If a comparison exists between the word in the input register 50 and a particular word in the associative memory 48, the related output line 52 is changed in voltage level, indicating that a comparison exists and that the desired data word is present in the thin film data memory 42. The interlock 14 is not operated and no core memory access takes place. See FIGURE 3B.

The associative memory 48 operates entirely on voltage levels and completes its comparison operation in substantially less than a clock pulse interval. Thus, before the clock pulse time $t_1$, following the start of a processor memory cycle at time $t_0$, the comparison operation of the associative memory 48 is complete and if a comparison is present, the level is set on a corresponding output line 52 from the associative memory 48 prior to the clock pulse time $t_1$. All of the output lines 52 from the associative memory 48 are applied to an OR circuit 53, the output of which is applied through an inverter 54 to control a gating circuit 56. Thus in the event no comparison is made by the associative memory 48, the gating circuit 56 is biased open. If a comparison is made by the associative memory 48, the gating circuit 56 is closed by the output of the inverter 54. Assuming no comparison is made, indicating that the required data word is not present in the thin film data memory 42 but must be obtained from the memory unit 12, a signal is passed at clock pulse time $t_1$ by the gate 56 to the control input 16 of the switch interlock 14. The input pulse to the gate 56 is derived from an AND circuit 58 to which is applied the clock pulses together with a control level from the central control unit 24 and the level from the output gate 30, setting up a memory read cycle as described above.

Assuming for the present that the address in the address register 20 is found in the associative memory 48, indicating that the desired data word is stored in the thin film data memory 42, a readout of the data word from the high speed memory 42 to the data register 18 in the processor is initiated. To this end, a flip-flop in the register 46 is set by the particular output line 52 from the associative memory 48. The setting of the particular flip-flop in the register 46 produces a corresponding linear select of the associative word in the thin film data memory 42. The output of the AND circuit 58 at time $t_1$ is applied to the read input of the thin film data memory 42 resulting in the selected word in the memory 42 being placed in the buffer register 44. See FIGURE 3E. The word in the buffer register 44 is transferred to the data register 18 by means of a gate 60 at clock time $t_2$, the gate 60 being biased open by the central control unit 24.

Because of the high speed of operation of the thin film memory and the associative memory, the memory cycle can be completed in two clock pulse intervals instead of the five clock pulse intervals required to access the core memory unit 12. Substantial reduction of time is thereby achieved where a data word is stored in the copy memory 40.

The manner in which words are stored in the thin film data memory for access by the data processor 10 will now be described in connection with the timing wave form of FIGURES 2D–F. Words are written in the thin film data memory 42 during a memory read cycle by the data processor 10. Whenever a memory read cycle is initiated at the data processor 10, in the manner described in detail above, circuits in the copy memory 40 determine whether or not the word being accessed in the memory unit 12 should be stored in the copy memory 40. Two conditions must be considered in this situation. If the data memory 42 is not filled to capacity, a new word can be added to it. In addition, if a particular word in the copy memory 40 has not been used by the processor 10 for a predetermined period of time, it is replaced. During the interval preceding clock time $t_5$ of the memory read cycle, the word in the buffer register 36 of the memory unit 12 is transferred by means of the gate 51 to the data register 18 as mentioned above. At the same time, the data word is also placed in the buffer register 44 through an OR circuit 63 where it is available to be written into the the thin film data memory 42 by the clock pulse $t_5$. The clock pulse is passed by a gate 62 to the write input of the thin film data memory 42. The gate 62 is biased open together with the gate 51 in response to the control level from the central control unit 24. However, it should be noted that an actual transfer of the word from the buffer register 44 into the memory 42 can take place only if one of the address lines is set to address a particular word location in the thin film data memory. Addressing of the thin film data memory 42 to select a location to insert a new data word is controlled in the following manner.

As noted above, the address of the data word being selected from memory is initially established in the address register 20 and applied to the input register 50 for the purpose of making a comparison in the associative memory 48. If no comparison exists, an access is made to the memory unit 12 from which the data word is placed in the data register 18 and in the buffer register 44 from the buffer register 36 of the memory unit 12.The copy memory 40 is provided with a weighing circuit 64 which may consist of timing circuits, such as monostable multivibrators, there being one for each memory location in the thin film memory 42. These timing circuits are set initially in response to the setting of a corresponding flip-flop in the register 46. Thus every time a particular memory location in the thin film memory 42 is addressed, an associated timer in the weighing circuit 64 is reset to start a timing cycle. If the corresponding memory location in the thin film memory 42 is not addressed again within the time interval determined by the timer, the timer runs out and provides a signal in a corresponding output line, the output lines being indicated at 66. Thus the weighing circuit provides an indication that a particular memory location has not been accessed for a predetermined period of time, making this memory location available for a new data word. If none of the timing circuits provides signals on the output line 66, this is an indication that all of the memory locations in the thin film memory 42 have been accessed within a predetermined time and therefore none of the words should be replaced.

The output lines 66 from the timing circuit 64 are applied to a priority circuit 68. The priority circuit provides a means of selecting one of the memory locations where more than one is indicated as being available by the output signals from the timing circuit 64. If two or more of the output lines 66 from the timing circuit 64 are energized, the priority circuit 68 energizes only one output line on a selected priority basis.

The outputs from the priority circuit 68 are applied through a gating circuit 70 to corresponding ones of the flip-flops in the register 46. A pulse is applied to the gating circuit 70 from the output of the gating circuit 56 at time $t_1$. See FIGURE 2D. If none of the timing circuits are timed out at clock pulse time $t_1$, then none of the flip-flops 46 will be set. If one or more of the timing circuits is timed out at the time the clock pulse $t_1$ is generated, then one of the flip-flops 46 is set on a priority basis established by the priority circuit 68.

At the same time, the corresponding address has to be stored in an associative memory 48. This is accomplished by applying the output lines from the gating circuit 70 to the write lines of the associative memory 48. Depending upon which one of the write lines is pulsed by the output of the gating circuit 70, the address in the input register 50 is written into the corresponding word location in the associative memory. In this manner the address and the data word are stored in the copy memory 40 to be available to the data processor 10 on a subsequent memory read cycle.

Normally the copy memory 40 is not involved in a memory write cycle by the data processor 10. However, if the memory address in which a data word is to be stored in the memory unit 12 from the data processor 10 is present in the associative memory 48, it is desirable to place the new data word in the thin film data memory 42 as well as replacing the word in the core memory. In the data write cycle by the data processor 10, the address is again stored in the address register 20, the data word to be written into the memory is stored in the data register 18 and the read/write flip-flop 22 is set to indicate a write operation. At clock pulse time $t_0$ (see FIGURE 4A), the central control unit 24 sets the gates 31, 28 and 26. The output from the gate 31 opens a gate 72 passing the next clock pulse to the input 16 of the switch interlock 14. See FIGURE 4B. This permits the contents of the address register 20 to be transferred to the address register 34 in the memory unit 12 and the contents of the data register 18 to be transferred to the buffer register 36 of the memory unit 12. At the same time, the output of the gate 31 from the read/write flip-flop 22 sets up a write operation in the memory unit 12. The write operation is then completed in the memory unit 12 independently of the data processor 10 in conventional manner. Thus the data processor 10 is only tied up for two clock pulse intervals in doing a memory write cycle.

As pointed out above, the copy memory 40 is only involved in the memory write cycle in the event that the corresponding address is found in the associative memory 48. Thus during the initial clock pulse interval when the contents of the address register 28 are passed by the gate 28 to the input register 50, a comparison is automatically made by the associative memory 48. If a comparison results, as indicated above, one of the output lines 52 is changed in voltage level. In this event, the contents of the data register 18 are transferred to the buffer register 44 in the copy memory 40 by means of a gating circuit 74 which is opened by the output of a logical AND circuit 76 when it senses that the flip-flop 22 is in the write condition and that one of the output lines 52 changes the voltage level on the output of the OR circuit 53. The output level from the AND circuit 76 is also applied to the gate 62 associated with the write input of the thin film data memory 42. Thus the next clock pulse causes the data word in the buffer register 44 to be transferred into the thin film data memory 42 to the address location established by the associative memory 48.

From the above description, it will be seen that the present invention provides a small high speed copy memory which holds copies of selected data words held in the core memory. The copy memory is not addressable by a program and therefore in no way affects the programming of the computer. By virtue of the timing or weighing circuit 64, the copy memory is designed so that it accumulates words which are used repeatedly by the processor. Whenever the processor attempts to access a word stored in the core memory which is also held in the copy memory, the word is automatically taken from the copy memory directly and the time involved in making access to the main memory is avoided. The copy memory provides a substantial saving of time in the read cycle although it is of no particular advantage in the memory write cycle. Since normally read cycles greatly outnumber write cycles in the operation of a computer, the copy memory is capable of providing a quite significant gain in overall operating time.

What is claimed is:

1. A computer system, a first memory unit for storing a large number of digitally coded words in addressable storage locations, a high speed copy memory including a second memory unit for storing a small number of digitally coded words, an associative memory for storing a corresponding number of addresses, the associative memory making a comparison between an address word applied to the input and each of the addresses stored therein for energizing a different output depending on the location of an address in the associative memory on which a comparison exists with the address word applied to the input, means selectively responsive to the different outputs of the associative memory for selecting a corresponding location in the second memory, a processor including means for initiating a memory access to the first memory for reading out a word from a designated address in the first memory, means for applying the address to the input of the associative memory at the start of the memory access, means responsive to an output signal from the associative memory for interrupting the memory access to the first memory, means for reading out the word from the second memory selected by the associative memory and transferring the word to the processor, a plurality of binary timing circuits which reset after a predetermined time interval on being set, there being one timing circuit associated with each storage position in the copy memory, means responsive to the associative memory output when the designated address on which a comparison is made is present in the associative memory for setting the associated timing circuit, and means responsive to the timing circuit for storing the address word from the processor into the associative memory when no comparison is made and at least one of the timing circuits is in a reset state.

2. In a computer system having an addressable main memory unit and a high speed copy memory unit in which words read out of the main memory unit into the computer system are also stored together with the main memory address in the copy memory, and having means for simultaneously comparing all the addresses stored in the copy memory unit when the computer system addresses the main memory unit to select and read out the addressed word from the copy memory if the address is present in the copy memory, the improvement comprising means in the computer system initiating the transfer of a word to the main memory for writing the word in the memory unit, means responsive to said initiating means for transferring an address simultaneously to the main memory unit and to the comparing means associated with the copy memory unit, means responsive to said initiating means for writing the word in the specified address location in the main memory unit, and means responsive to said comparing means when the specified address is present in the copy memory for simultaneously writing the same word in the copy memory together with the address, whereby the words in the high speed copy memory are always identical to the related words in the main memory.

3. Apparatus as defined in claim 2 wherein the copy memory unit further includes a plurality of binary timing circuits which reset after a predetermined time interval on being set, there being one timing circuit associated with each storage position in the copy memory, means responsive to the associative memory output comparing means when the designated address on which a comparison is made is present in the associative memory for setting the associated timing circuit, means responsive to the timing circuits for storing the address word from the processor into the associative memory when no comparison is made and at least one of the timing circuits is in a reset state.

References Cited

UNITED STATES PATENTS

| | | | |
|---|---|---|---|
| 3,229,260 | 1/1966 | Falkoff | 340—172.5 |
| 3,242,467 | 3/1966 | Lamy | 340—172.5 |
| 3,248,708 | 4/1966 | Haynes | 340—172.5 |
| 3,251,041 | 5/1966 | Chu | 340—172.5 |
| 3,258,748 | 6/1966 | Schneberger et al. | 340—172.5 |
| 3,275,991 | 9/1966 | Schneberger | 340—172.5 |
| 3,292,153 | 12/1966 | Barton et al. | 340—172.5 |

ROBERT C. BAILEY, *Primary Examiner.*

PAUL J. HENON, *Examiner.*